United States Patent
Grems et al.

(10) Patent No.: US 7,862,072 B2
(45) Date of Patent: Jan. 4, 2011

(54) PASSENGER AIR BAG CHUTE ASSEMBLY

(75) Inventors: Lisa Ann Grems, West Bloomfield, MI (US); Timothy Frances O'Brien, White Lake, MI (US); Bradley Warren Harris, South Lyon, MI (US)

(73) Assignee: Intier Automotive Inc., Newmarket (CA)

( * ) Notice: Subject to any disclaimer, the term of this patent is extended or adjusted under 35 U.S.C. 154(b) by 173 days.

(21) Appl. No.: 12/281,788

(22) PCT Filed: Mar. 6, 2007

(86) PCT No.: PCT/CA2007/000347

§ 371 (c)(1),
(2), (4) Date: Sep. 5, 2008

(87) PCT Pub. No.: WO2007/101334

PCT Pub. Date: Sep. 13, 2007

(65) Prior Publication Data

US 2009/0026741 A1    Jan. 29, 2009

Related U.S. Application Data

(60) Provisional application No. 60/779,529, filed on Mar. 6, 2006.

(51) Int. Cl.
*B60R 21/205*    (2006.01)

(52) U.S. Cl. .................................. 280/728.3; 280/732

(58) Field of Classification Search .............. 280/728.2, 280/728.3, 732
See application file for complete search history.

(56) References Cited

U.S. PATENT DOCUMENTS

| | | | |
|---|---|---|---|
| 4,181,514 A | | 1/1980 | Lefkowitz et al. |
| 5,382,047 A | * | 1/1995 | Gajewski .................. 280/728.3 |
| 5,393,089 A | * | 2/1995 | Pakulsky et al. ......... 280/728.3 |
| 5,449,196 A | * | 9/1995 | Ohno et al. ............... 280/728.3 |
| 5,639,115 A | | 6/1997 | Kelley et al. |
| 5,643,390 A | | 7/1997 | Don et al. |
| 5,769,451 A | * | 6/1998 | Inada et al. .................. 280/732 |

(Continued)

FOREIGN PATENT DOCUMENTS

EP    0495655 A1    7/1992

(Continued)

*Primary Examiner*—Paul N Dickson
*Assistant Examiner*—Joseph Rocca
(74) *Attorney, Agent, or Firm*—Warn Partners, P.C.

(57) ABSTRACT

The present invention is directed to a seamless airbag door assembly for a motor vehicle. A panel having an inner surface and an outer surface. The inner surface of the panel has predetermined breaking lines that are not visible when the panel is viewed from the outside surface. A scrim is connected to the inner surface of the panel and has a cut-line operable aligned with the predetermined breaking lines of the inner surface of the panel. An airbag chute is connected to the scrim and inner surface of the panel in order to connected the airbag chute to the panel.

11 Claims, 1 Drawing Sheet

U.S. PATENT DOCUMENTS

| | | |
|---|---|---|
| 5,775,727 A | 7/1998 | Sun et al. |
| 5,934,702 A | 8/1999 | Coleman |
| 6,079,733 A * | 6/2000 | Towler .................... 280/728.3 |
| 6,453,535 B1 | 9/2002 | Nicholas |
| 2002/0000711 A1 * | 1/2002 | Schmidt et al. .......... 280/728.3 |
| 2004/0232668 A1 | 11/2004 | DePue et al. |
| 2005/0127641 A1 * | 6/2005 | Cowelchuk et al. ...... 280/728.3 |
| 2005/0269804 A1 * | 12/2005 | Yamada et al. ........... 280/728.3 |

FOREIGN PATENT DOCUMENTS

| | | |
|---|---|---|
| WO | WO 2004/067330 A1 | 8/2004 |
| WO | WO 2004/076233 A2 | 9/2004 |
| WO | WO 2006/004077 A1 | 1/2006 |

* cited by examiner

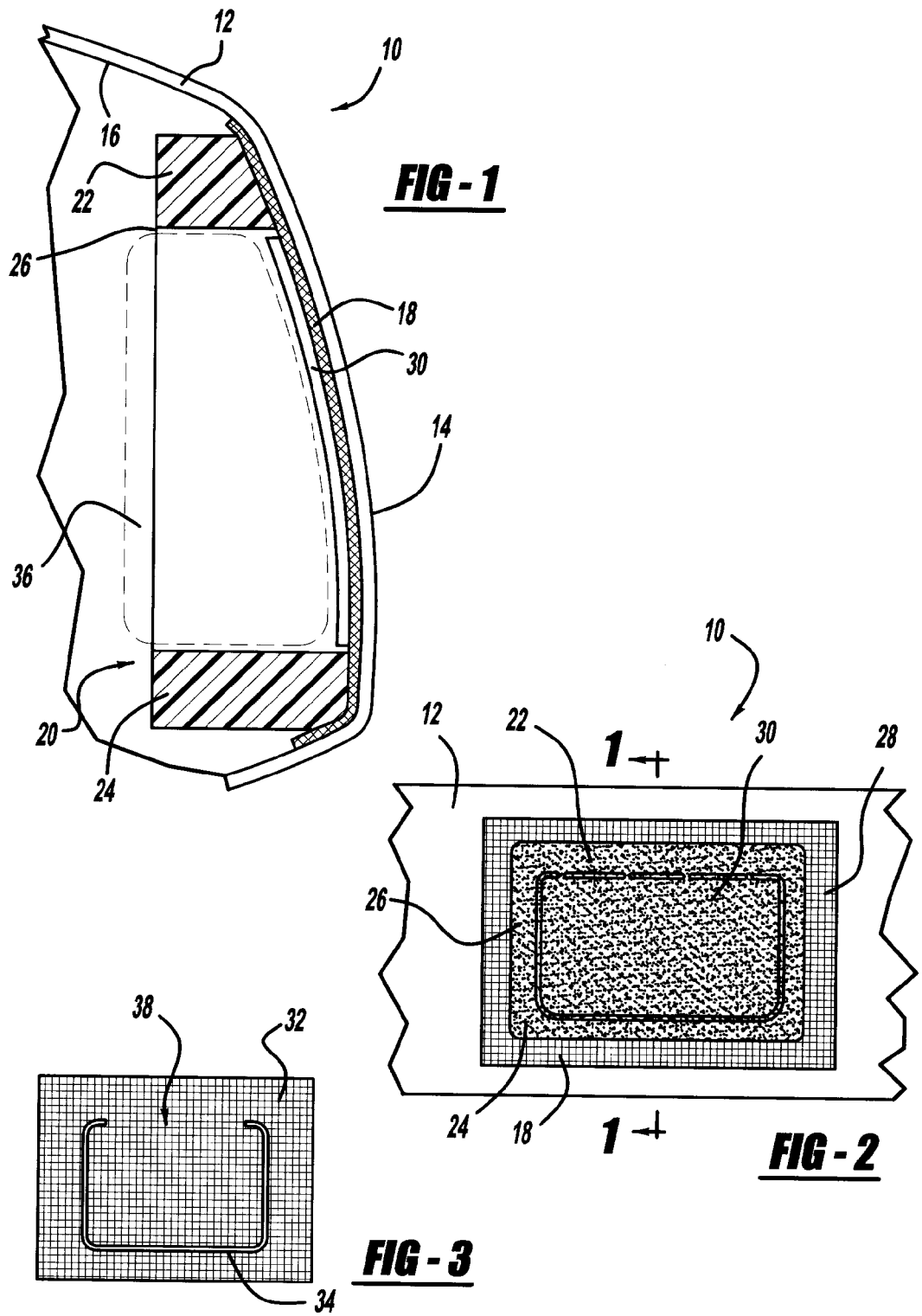

PASSENGER AIR BAG CHUTE ASSEMBLY

CROSS-REFERENCE TO RELATED APPLICATIONS

This application claims the benefit of U.S. Provisional Application No. 60/779,529, filed Mar. 6, 2006. The disclosure of the above application is incorporated herein by reference.

FIELD OF THE INVENTION

The present invention relates to the use of a metal scrim on a passenger airbag door panel on the interior of an automobile.

BACKGROUND OF THE INVENTION

Airbags are a common safety device used in automobiles to prevent injury to the vehicle passengers when an accident occurs. Typically, airbags are integrated into the steering wheel or the dashboard and deploy when the vehicle is in a collision; if the vehicle is hit head-on, the momentum of the driver and passenger will be absorbed by the airbag, and the driver and passenger will avoid hitting the steering wheel and dashboard, respectively.

As technology has developed, airbags are also being used in other areas of the vehicle besides the steering wheel and dashboard. It has become commonplace for airbags to be used in door panels and overhead panels in the interior of the vehicle.

When the airbag is installed in the vehicle, it is placed in an area that will provide a minimal amount of interference with the use of the vehicle because the airbag is only necessary when there is a collision. It is common for aesthetic reasons for the airbag to be covered by a panel that follows a similar contour to, for example, the rest of the instrument panel of the vehicle and is similar in color. The modern trend with airbags is to have a seamless panel covering the airbag so as to disguise the location of the airbag completely. The airbag is typically located in a chute, and a door behind the panel aids in holding the airbag in place. It is important to prevent any panels or breakaway structures from being propelled toward the driver or passengers when deployed.

The processes of either the heat-staking or vibration welding are expensive, both in capital and required labor costs. Accordingly, there exists a need for an improved assembly of a plastic airbag door in an instrument panel.

SUMMARY OF THE INVENTION

The present invention is directed to a seamless airbag door assembly for a motor vehicle. A panel having an inner surface and an outer surface. The inner surface of the panel has predetermined breaking lines that are not visible when the panel is viewed from the outside surface. A scrim is connected to the inner surface of the panel and has a cut-line operable aligned with the predetermined breaking lines of the inner surface of the panel. An airbag chute is connected to the scrim and inner surface of the panel in order to connected the airbag chute to the panel.

Upon deployment of an airbag through the airbag chute, the panel ruptures along the predetermined breaking lines, and the door assembly opens outward away from the panel along with the ruptured portion of the panel and the area of the scrim connected to the door.

The scrim acts as a hinge to prevent the door assembly and the ruptured portion of the panel from detaching from rest of the panel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a sectional side view of a seamless passenger airbag door, according to the present invention;

FIG. 2 is a plan view of the back side of a seamless passenger airbag door according to the present invention; and FIG. 3 is a front view of a scrim having a pre-cut breaking line, according to the present invention.

DETAILED DESCRIPTION OF THE PREFERRED EMBODIMENTS

The following description of the preferred embodiment(s) is merely exemplary in nature and is in no way intended to limit the invention, its application, or uses.

A seamless passenger airbag door assembly 10 in the interior of an automobile is generally shown in FIGS. 1 and 2. A panel 12 has an exterior surface 14 and an interior surface 16. The panel 12 can be any type of interior structure of a vehicle where it is desirable to place an airbag. For example the panel 12 can be a instrument panel, door panel, steering wheel, pillar, headliner, headrest, etc. Connected to the interior surface 16 of the panel 12 is a scrim 18. The scrim 18 is a coarse mesh that can be made of metal or other suitable conductive material. In applications where resistive implant welding is not used to assemble the airbag 10, the scrim 18 can be made of a non-conductive, non-metallic material.

Operably connected to the scrim 18 is an airbag chute 20 formed by an upper support 22, a lower support 24, a first side support 26, and a second side support 28 that can be separate components or integrated into a single piece. The airbag chute 20 surrounds a door assembly 30; in the embodiment shown, the door assembly 30 and airbag chute 20 are connected to the scrim 18. The door assembly 30 and airbag chute 20 can be separate components or they can be formed together. The scrim 18 is larger in area that the airbag chute 20 and the door assembly 30. The scrim 18 is also pre-cut on three sides as shown in FIG. 3. An uncut side forms a hinge 38 portion that allows the scrim 18 to fold.

The panel 12 also includes pre-determined breaking lines (not shown) which are located on the inner surface 16 and are of the same shape as the airbag chute 20. Locating the pre-determined breaking lines on the inner surface 16 will allow them to be hidden from view of the passengers, thus concealing the position of the airbag (not shown) and providing a seamless airbag door 10 while still allowing the airbag to be deployed through the panel 12.

Assembly is achieved through a process known as resistive implant welding (RIW). The scrim 18 is positioned against the inner surface 16 of the panel 12, and the airbag chute 20 is placed against the scrim 18. The resistive implant welding process involves applying an electrical current to the scrim 18, which in this particular application is made of metal or another suitable conductive material, while the scrim 18 is in contact with the airbag chute 20 and the panel 12. The electrical current causes the scrim 18 to heat up. The heated scrim 18 will cause the panel 12 and the airbag chute 20 to melt. Upon cooling, the scrim 18 is firmly connected to the inner surface 16 of the panel 12 and the airbag chute 20. The use of the resistive implant welding process has the advantage of connecting the scrim 18 to the panel 12 and the airbag chute 20 as a single step in the manufacturing process. Other ways of heating the scrim material which facilitates the melt can be used. For instance the scrim 18 can be heated by an induction heating process and achieve the same results.

It is not necessary for the upper support member, 22, lower support member 24, first side support member 26 and second side support member 28 to all be attached to the inner surface 16. It is possible to only connect two sides and still secure the panel 12 and airbag chute 20 together.

The scrim 18 is bonded to the panel 12 in two ways. The scrim 18 is either post applied to the panel 12 or the scrim 18 is over molded with the panel 12. When the scrim 18 is over molded with the panel 12, the scrim 18 is either partially embedded in the panel 12 or fully embedded in the panel 12. After the scrim 18 and panel 12 are attached to one another, the airbag chute 20 is placed on the panel 12 and scrim 18. However, if the scrim 18 is fully embedded in the panel 12, the airbag chute 20 is only placed on the panel 12. After that, heat or electrical current is applied to the scrim 18 which in turn melts the thermo plastic of the panel 12 and/or the air bag chute 20 for melt bonding them together. For example, when the heat is applied to the scrim 18 the heat is transferred from the scrim 18 to the panel 12, and the surface of the panel 12 melts in order to create a tacky or sticky surface which is capable of adhering to the surface of the airbag chute 20 as the surface of panel 12 cools. Furthermore, the heat or electric current applied to the scrim 18 can also be transferred to the panel 12 and the airbag chute 20 when the airbag chute 20 contacts the panel 12. Thus, both the surface of the panel 12 and the surface of the airbag chute 20 melt in order to create a tacky or sticky surface which adhere together when the surfaces cool.

In operation, an airbag device 36 is located in the airbag chute 20, and remains there when not in use. Upon deployment, the airbag device 36 will apply pressure against the door assembly 30, which will in turn apply pressure against the scrim 18, and the panel 12. The pre-determined breaking lines will allow the portion of the panel 12 covering the airbag chute 20 to breakaway forming a ruptured portion of the panel 12, and the door assembly 30 will be pushed outward. The area of the scrim 18 covering the airbag chute 20 will also breakaway along the cut-lines 34. Upon airbag deployment, the ruptured portion of the panel 12, the portion of the scrim 18 covering the airbag chute 20, and the door assembly 30 will open as a single unit, and the airbag will inflate. The hinge portion of the scrim 38 will act as a hinge, preventing the door 30 and the panel 12 from hitting the passengers during airbag deployment.

FIG. 3 shows a pre-cut scrim 32; the pre-cut scrim 32 has a cut-line 34 which matches the dimensions of the airbag chute 20 shown in FIGS. 1 and 2. The cut-line 34 is added to the pre-cut scrim 32 to facilitate the deployment of the airbag from the airbag chute 20. The cut-line 34 can be precut into the scrim 32 prior to assembly, or the cut-line 34 can be laser cut into the scrim 18 at the same time the pre-determined breaking lines are laser cut into the panel 12. Any type of cut which achieves the necessary hinge feature can be used in the present invention. Thus serrations or living hinges can be provided by die cutting, laser cutting, knife cutting or saw cutting, or otherwise scoring the perforation or partial cutting of the thickness of the door assembly along the cut line 34 for creating the hinge.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An airbag door assembly for a motor vehicle, comprising:
 a panel having an inner surface and an outer surface, said inner surface having pre-determined breaking lines formed thereon defining a ruptured portion of said panel;
 a scrim connected to said inner surface of said panel, said scrim having a cut-line operably aligned with said pre-determined breaking lines of said inner surface;
 an airbag chute; wherein said airbag chute is connected to said scrim and said inner surface of said panel, a door assembly surrounded by said airbag chute, said door assembly is connected to said scrim, wherein said scrim extends beyond an outer perimeter of said airbag chute; and
 a hinge portion of said scrim formed by an uncut side of said scrim, said hinge portion folds said scrim, ruptured portion of said panel and said door assembly during deployment of said airbag and keeps said ruptured portion of said panel, said scrim and said door assembly connected to said panel upon deployment of said airbag.

2. The airbag door assembly of claim 1, wherein said scrim is made of an electrically conductive material.

3. The airbag door assembly of claim 1, further comprising an airbag device operably associated with said airbag chute, wherein upon deployment of an airbag from said airbag chute, said panel ruptures along said predetermined breaking lines, and said scrim opens outward away from said panel along with said ruptured portion of said panel.

4. The airbag door assembly of claim 1, wherein said scrim is a mesh material.

5. The airbag door assembly of claim 1, wherein said panel is one selected from the group comprising a door panel, pillar, instrument panel, steering wheel, headliner and headrest.

6. An airbag door assembly comprising:
 a panel having an inner surface and an outer surface, said inner surface having pre-determined breaking lines defining a ruptured portion of said panel;
 a scrim having a cut-line and located in connection with said inner surface of said panel;
 an airbag chute having an upper support, a lower support, a first side support, and a second side support, wherein said airbag chute is connected to said panel through heating of said scrim where at least one of a surface of said airbag chute and a surface of said panel are at least partially melted in order to create a seamless airbag door, wherein said scrim extends beyond an outer perimeter of said airbag chute;
 a door assembly connected to said scrim and surrounded by said cut-line of said scrim;
 an airbag device mounted in said airbag chute adjacent said door assembly; and
 a hinge portion of said scrim formed by an uncut side of said scrim, said hinge portion folds said scrim, ruptured portion of said panel and said door assembly during deployment of said airbag and keeps said ruptured portion of said panel, said scrim and said door assembly connected to said panel upon deployment of said airbag.

7. The airbag door assembly of claim 6, wherein said scrim is made of an electrically conductive material.

8. The airbag door assembly of claim 6, wherein said pre-determined breaking lines on said inner surface of said panel are aligned with said upper support, said lower support, said first side support, and said second side support of said airbag chute.

9. The airbag door assembly of claim 6, wherein upon deployment of said airbag device, said door assembly is pushed toward said panel and said panel ruptures along said predetermined breaking lines, and said door assembly opens outward away from said panel along with said ruptured portion of said panel and the area of said scrim connected to said door assembly.

10. The airbag door assembly of claim 6, wherein said scrim is a mesh material.

11. The airbag door assembly of claim 6, wherein said panel is one selected from the group comprising a door panel, pilar, instrument panel, steering wheel, headliner and headrest.

* * * * *